United States Patent
Ito et al.

[15] 3,686,294
[45] Aug. 22, 1972

[54] PROCESS FOR THE PRODUCTION OF METHACRYLIC ACID

[72] Inventors: Yoshio Ito; Shinichi Amiyama; Akinobu Toyoda; Shoichitro Minami, all of Yokohama, Japan

[73] Assignee: The Japanese Geon Company, Ltd., Tokyo, Japan

[22] Filed: Oct. 6, 1970

[21] Appl. No.: 78,593

[52] U.S. Cl. ............................................. 260/530 N
[51] Int. Cl. ............................................. C02c 51/32
[58] Field of Search .................... 260/530 N, 533 N

[56] References Cited

UNITED STATES PATENTS

| | | | |
|---|---|---|---|
| 3,190,913 | 6/1965 | Fetterly et al. | 260/533 N |
| 3,379,652 | 4/1968 | Young | 260/533 N X |

FOREIGN PATENTS OR APPLICATIONS

| | | | |
|---|---|---|---|
| 42/6,246 | 2/1967 | Japan | 260/530 N |
| 42/2,255 | 3/1967 | Japan | 260/530 N |

*Primary Examiner* — Lorraine A. Weinberger
*Assistant Examiner* — Richard D. Kelly
*Attorney* — Sherman and Shalloway

[57] ABSTRACT

A process for the production of methacrylic acid which comprises catalytically reacting in the vapor phase a gaseous mixture containing methacrolein and molecular oxygen at an elevated temperature in the presence of a catalyst consisting of molybdenum arsenic, phosphorus, and oxygen, said catalyst being of a composition such that the atomic ratio of molybdenum to arsenic is (7–30):1 and the atomic ratio of molybdenum to phosphorus is (5–30):1.

3 Claims, No Drawings

PROCESS FOR THE PRODUCTION OF METHACRYLIC ACID

This invention relates to a process for the production of methacrylic acid by the vapor phase oxidation of methacrolein. More specifically, the invention relates to a process for the production of methacrylic acid by the vapor phase catalytic reaction of a mixture containing mechacrolein and molecular oxygen at an elevated temperature in the presence of a catalyst consisting of molybdenum, arsenic, phosphorus and oxygen of specified composition.

Numerous patents relating to catalysts to be used for the reaction for synthesizing unsaturated acids by the vapor phase oxidation of either acrolein or methacrolein have been granted to date. However, practically all of these conver the manufacture of acrylic acid from acrolein, and while the claims do have such statements which comprehend the manufacture of methacrolein, the cases in which examples illustrating the oxidation of methacrolein are specifically disclosed are very few. Moreover, when the oxidation of methacrolein is actually carried out using the catalysts suggested, in practically all cases there are such drawbacks as that the combustion reaction of methacrolein is pronounced, the conversion is extremely low owing to the extremely low activity of the catalyst, or the life of the catalyst is too short. Thus, the catalysts which were heretofore effective in the oxidation of acrolein or those catalysts which have been proposed as being useable for the oxidation of methacrolein have in practically all cases not demonstrated results good enough to enable them to be used as catalysts in the actual commercial production of methacrylic acid from methacrolein. Hence, there has been no instance of the commercial production of methacrylic acid by the vapor phase oxidative reaction of methacrolein. In short, these facts show that, as customary in the catalyst art, it is actually impossible to foresee a commercially useable catalyst for the oxidation of methacrolein and that the effects of a catalyst can only be confirmed as a result of substantialation thereof by means of experiments.

Accordingly, an object of the present invention resides in finding a catalyst whose life is long and which can form methacrylic acid at a high selectivity and in good yield and at a high conversion of methacrolein at a relatively low reaction temperature, thereby making the production of methacrylic acid by the vapor phase oxidation of methacrolein commercially feasible.

Other objects of the invention will become apparent from the following description.

It was found that these objects of the invention could be achieved by contacting molecular oxygen with methacrolein in the vapor phase in the presence of a catalyst consisting of molybdenum, arsenic, phosphorus and oxygen of specified composition, as hereinafter indicated.

The catalyst of the present invention is represented by the formula

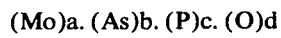

$(Mo)_a \cdot (As)_b \cdot (P)_c \cdot (O)_d$ wherein $a$, $b$, $c$ and $d$ are respectively the number of atoms of the several elements, with the proviso that ratios thereof must be within the limited ranges of $a:b = (7-30):1$, preferably $(10-20):1$; as well as $a:c = (5-30):1$, preferably $(10-20):1$. On the other hand, $d$ is the number of atoms of oxygen which satisfies the valences of Mo, As and P. If the atomic ratio of molybdenum to arsenic or that of molybdenum to phosphorus is outside the foregoing range, either the catalytic activity declines or a marked drop in the selectivity for methacrylic acid takes place. For example, if $a:b$ becomes smaller than 7:1, the catalytic activity declines. On the other hand, if this ratio becomes greater than 30:1 the selectivity for methacrylic acid drops. Thus, only when the atomic ratios of molybdenum, arsenic and phosphorus have been limited to the hereinbefore indicated specified composition is it possible to obtain the methacrylic acid at high selectivity and good yield and at a high conversion of the methacrolein over a long period of time at a relatively low temperature. Further, for a still greater enhancement of the activity of the invention catalyst, the addition as an assistant catalyst component of a small amount of such as boron, silicon, tungsten, cadmium, germanium, lead, tin and indium may be made.

As regards the catalyst having molybdenum, arsenic, phosphorus and oxygen as its constituent components, known are, for example the catalyst which synthesize acrylic acid from propylene and that which synthesize acrolein from propylene, as disclosed in Belgian Pat. No. 616,690 and Japanese Patent application No. 3281/1968, respectively. In accordance with the former method, however, acrolein and acrylic acid are conjointly produced, with the proportion formed of acrolein predominating, whereas in the latter method the proportion formed of acrolein exceeds 95 percent. In contrast, the invention catalyst consisting of molybdenum, arsenic, phosphorus and oxygen of specified composition is very effective as a catalyst for producing methacrylic acid from methacrolein. For example, while the yield of methacrylic acid at a reaction temperature of 375° – 390°C. in accordance with hereinabove noted known catalysts is only 10 – 20 percent, a high yield of 35 – 64 percent is achieved at a relatively low reaction temperature of 325° – 350°C. by the use of the invention catalyst.

The method of preparing the catalyst is not of such significance as to limit the effects of the present invention. The preparation of the catalyst may be by such as the oxides mixing method, the evaporative drying method and coprecipitation method, which are all known in the art. That is to say, the starting material of the several constituent elements of the catalyst need not necessarily be in the form of an oxide but may be either the metal, as such, a metal salt, an acid or a base as long as it is one capable of being converted finally to the corresponding metal oxide by means of calcination. As examples of these, mention can be made of such as molybdicacid, ammonium molbdate, phosphomolybdic acid, arsenic acid, pyroarsenic acid and phosphoric acid. The catalyst composition, prior to its use, is preferably calcined for several hours to several tens of hours at 300°– 650°C., and preferably 350°– 550°C., in either air, a reducing atmosphere or the feed gas. A catalyst desirable for use in this invention is prepared, for example, either by evaporatively drying an aqueous ammonia solution containing phosphomolybdic acid and arsenic acid followed by calcination of the dried product or by thoroughly mixing molybdic trioxide, arsenic trioxide and phosphoric acid with a small amount of water and thereafter drying and calcining this mixture. As regards the state in which the several elements are present in the catalyst, this is not clear. It is not known as to whether the several elements are merely present as a mixture thereof in the form of oxides or whether the several elements are in a bonded state, either directly or through the intermediary of oxygen.

In practicing the invention, the feed gas consisting of methacrolein in mixture with oxygen (commercially air is used with advantage) is used. Further, a gas which does not effect the reaction, such, for example, as steam, nitrogen, carbon dioxide, helium, argon, saturated hydrocarbons (e.g. methane, ethane, propane, butane and pentane) may be introduced into the reaction system as a diluent. The presence of especially steam has a desirable effect from the standpoint of ensuring that the reaction proceeds stably as well as bringing about a great improvement in the conversion of methacrolein and selectivity for and yield of methacrylic acid.

The concentration of methacrolein in the feed gas is preferably within a range of 1 – 25 volume percent. Further, a molar ratio of methacrolein to oxygen in the range of 1:0.1 – 5.0 is convenient.

While the catalyst can be used as such by molding it or rendering it into powder form, it is also possible to use it after dilution with a diluent. Again, the catalyst can also be used deposited on a suitable carrier material. As these diluents or carriers, materials which are inert to the reaction such as alumina, silicon carbide, graphite, titanium dioxide, zirconium oxide, thorium chloride, pumice, silica gel and celite, or a metal such as aluminum can be used. Since the amount in which the diluent or carrier is used has no essential effect on the activity of the catalyst, the amount used can be suitably chosen.

In practicing the invention, a reaction temperature of 250° – 450°C., and preferably 270° – 430°C., is used. The contact time is 0.1 – 20 seconds, and preferably 1 – 5 seconds (on the basis of 0°C., 1 atm.). On the other hand the reaction pressure ranges from reduced pressure below atmospheric presence (e.g. 0.1 kg/cm²) to 15 kg/cm², and preferably 1 – 10 kg/cm². These conditions are determined properly according to the reaction conditions.

The form of the reaction apparatus to be used in practicing the invention may be those which are well known such as the fluidized, moving or fixed bed. On the other hand, the methacrylic acid can be obtained from the reaction product by means of a known method, for example, the condensation method or the method of extraction with water or a suitable solvent.

The following examples are given for specifically illustrating the invention. The rate of conversion of the methacrolein, the yield of the methacrylic acid formed and selectivity therefor, as used in the examples, are defined below. The analysis was carried out in all cases by the gas chromatographic method.

$$\text{Conversion (\%)} = \frac{\text{methacrolein fed (mol)} - \text{unreacted methacrolein (mol)}}{\text{methacrolein fed (mol)}} \times 100$$

$$\text{Yield (\%)} = \frac{\text{methacrylic acid formed (mol)}}{\text{methacrolein fed (mol)}} \times 100$$

$$\text{Selectivity (\%)} = \frac{\text{yield}}{\text{conversion}} \times 100$$

EXAMPLE 1

1. Preparation of catalyst.

Catalyst A. 47.5 Grams (0.01 mol) of phosphomolybdic acid and 2.9 grams (0.02 mol) of arsenic acid were dissolved in 100 cc of 15 percent ammonia water, after which this solution was heated and concentrated with stirring until a muddy state was reached. The so obtained muddy material was placed in a dryer maintained at 130°C. and dried. Next, this dried matter was comminerted to 10 mesh particles and calcined at 400°C. for 5 hours in a tubular electric furnace while passing air therethrough. Thus was prepared the catalyst A.

Catalyst B. Catalyst B was prepared by operating as in the case with the preparation of catalyst A, except that 190.6 grams (0.1 mol) of arsenomolybdic acid and 9.8 grams (0.1 mol) of phosphoric acid were used instead of phosphomolybdic acid and arsenic acid.

Catalyst C. 173 Grams (1.2 mols) of molybdic trioxide, 9.8 grams (0.1 mol) of phosphoric acid and 9.9 grams (0.05 mol) of arsenic trioxide were thoroughly mixed with a small amount of water. The resulting muddy material was treated under identical conditions as in the case with the preparation of catalyst A to obtain the catalyst C.

Catalyst D. 235 Grams (1.2 mols) of ammonium molybdate, 14.2 grams (0.1 mol) of arsenic acid and 9.8 grams (0.1 mol) of phosphoric acid were thoroughly mixed with a small amount of water. The resulting muddy material was treated by operating as in the case with the preparation of catalyst A to prepare the catalyst D.

Catalysts E and X. Catalyst having the compositions shown in Table 2 were prepared by using moldbic acid and phosphoric acid in the amounts indicated instead of phosphomolybdic acid and by operating as in the case with the preparation of catalyst A. Catalysts X were prepared by way of comparison. Of the catalysts prepared, as hereinabove described, the catalyst compositions of A-D have in all cases an atomic ratio of the elements, exclusive of oxygen, of Mo:As:P = 12:1:1.

(2) Reaction operation.

Ten ml of each of the foregoing catalysts were charged to a glass reactor having an inside diameter of 14 ml, and the oxidation of methacrolein was carried out at the reaction temperatures indicated in Tables 1 and 2. The ratio by volume of methacrolein:oxygen:nitrogen in the feed gas was 5:7.5:87.5, and the contact time was 3.6 seconds.

The results obtained are shown in Tables 1 and 2.

TABLE 1

| invention catalyst | reaction temp. (°C.) | conversion of methacrolein (%) | yield of methacrylic acid (%) | selectivity for methacrylic acid (%) |
|---|---|---|---|---|
| A | 325 | 59.0 | 42.0 | 71.4 |
| B | 330 | 63.1 | 40.0 | 63.4 |
| C | 395 | 55.0 | 32.1 | 58.3 |
| D | 372 | 56.2 | 36.2 | 62.4 |

TABLE 2

| Catalyst | Atomic ratio of catalyst (Mo:As:P) | Reaction temperature (°C.) | Conversion of methacrolein (percent) | Yield of methacrylic acid (percent) | Selectivity for methacrylic acid (percent) |
|---|---|---|---|---|---|
| Invention E-1 | 12:1:1 | 325 | 59.0 | 37.0 | 62.7 |
| Invention E-2 | 12:1:0.6 | 350 | 60.1 | 36.7 | 61.0 |
| Invention E-3 | 12:0.5:1 | 343 | 64.5 | 35.0 | 54.3 |
| Control X-1 | 12:1:0 | 395 | 54.0 | 13.0 | 24.1 |
| Contorl X-2 | 12:0:1 | 390 | 71.0 | 12.3 | 17.3 |
| Control X-3 | 12:1:0.3 | 377 | 53.2 | 17.8 | 33.4 |
| Control X-4 | 12:0.3:1 | 380 | 69.4 | 14.5 | 20.9 |
| Control X-5 | 12:0.3:0.3 | 385 | 48.7 | 10.2 | 21.0 |
| Control X-6 | 12:3:1 | 375 | 57.3 | 21.4 | 37.7 |
| Control X-7 | 12:3:2 | 390 | 61.5 | 20.0 | 32.6 |
| Control X-8 | 12:6:1 | 392 | 68.4 | 13.7 | 20.0 |
| Control X-9 | 12:1:4 | 385 | 66.7 | 19.3 | 29.0 |

EXAMPLE 2

(1) Preparation of catalyst.

Catalyst F. 47.5 Grams (0.01 mol) of phosphomolybdic acid and 2.9 grams (0.02 mol) of arsenic acid were dissolved in 150 ml of about 20% ammonia water, after which 100 grams of alundum of ⅛-inch × ⅛-inch size were added thereto. The alundum-incorporated solution was then evaporated and dried, whereupon the catalyst composition was caused to adhere to the alundum. Next, this was calcined in air at 400°C. for 16 hours to prepare the alundum-supported catalyst F.

Catalyst G. A catalyst composition was prepared by the same procedure as in the case with the preparation of catalyst A, except that 238 grams (0.05 mol) of phosphomolybdic acid and 14.3 grams (0.1 mol) of arsenic acid were used and the calcination conditions were 400°C. for 16 hours. Next, after adding as lubricant 2 parts of graphite to 100 parts of this composition, it was made into tablets 5 mm in diameter × 5 mm high using a tabletting machine. Thus was prepared the catalyst G.

Catalyst H. Catalyst H was prepared by operating as in the case with the preparation of catalyst G, except that the amount of graphite incorporated was 15 parts.

Catalyst I. Catalyst I was prepared by operating as in the case with the preparation of catalyst G, except that in addition to the 2 parts of graphite 25 parts of metallic aluminum powder were also added.

The catalyst compositions F – I, prepared as hereinabove described, had in all cases an atomic ratio, exclusive of oxygen, of Mo:As:P = 12:1:1.

(2) Reaction operation.

One hundred ml. of each of the foregoing catalysts were charged to a reaction tube of 25 mm inside diameter made of stainless steel (SUS 27), and the oxidation reaction of methacrolein was carried out by heating with molten metal. The ratio by volume of methacrolein:oxygen:nitrogen:steam in the feed gas was 7:10.5:62.5:20, and the content time was 6 seconds. The results obtained are shown in Table 3.

Further, results obtained when a continuous reaction was carried out over a prolonged period of time, using catalysts G and I, are shown in Table 4.

TABLE 3

| catalyst | reaction temp. (°C.) | conversion of methacrolein (%) | yield of methacrylic acid (%) | selectivity for methacrylic acid (%) |
|---|---|---|---|---|
| F | 385 | 66.0 | 41.8 | 63.4 |
| G | 325 | 86.0 | 61.9 | 72.0 |
| H | 331 | 87.3 | 62.4 | 71.5 |
| I | 335 | 86.3 | 63.8 | 74.0 |

TABLE 4

| Catalyst | Reaction time (days) | Reaction remperature (°C.) | Conversion of methacrolein (percent) | Yield of methacrylic acid (percent) | Selectivity for methacrylic acid (percent) |
|---|---|---|---|---|---|
| G | 1 | 317 | 81.0 | 57.3 | 70.7 |
| G | 10 | 317 | 77.4 | 56.2 | 72.4 |
| G | 20 | 317 | 74.7 | 54.3 | 73.0 |
| G | 30 | 322 | 80.0 | 57.0 | 71.0 |
| I | 1 | 328 | 82.0 | 59.4 | 72.4 |
| I | 10 | 328 | 81.5 | 57.8 | 71.0 |
| I | 20 | 328 | 75.5 | 56.2 | 74.5 |
| I | 30 | 334 | 85.9 | 60.3 | 70.2 |

We claim:

1. A process for the production of methacrylic acid which comprises catalytically reacting a gaseous mixture containing methacrolein and molecular oxygen at an elevated temperature in the presence of a catalyst consisting of molybdenum, arsenic, phosphorus and oxygen, said gaseous mixture containing said methacrolein in a concentration of 1 – 25 percent by volume and the molar ratio of methacrolein to oxygen therein being from 1:0.1 to 1:5.0, said catalyst being of a composition such that the atomic ratio of molybdenum to arsenic is from 7:1 to 30:1 and the atomic ratio of molybdenum to phosphorus is from 5:1 to 30:1, said reaction being carried out in the vapor phase at a temperature of 250° – 450°C. and for a contact time of 0.1 – 20 seconds; 0°C., 1 atm.

2. The process of claim 1, wherein the catalyst is used supported on a carrier.

3. The process of claim 1, wherein the catalyst is diluted with a diluent.

* * * * *

UNITED STATES PATENT OFFICE
CERTIFICATE OF CORRECTION

Patent No. 3,686,294　　　　　　　　Dated　August 22, 1972

Inventor(s)　YOSHIO ITO ET AL

It is certified that error appears in the above-identified patent and that said Letters Patent are hereby corrected as shown below:

In the Heading, insert applicants' claim for priority as follows:

-- Claims priority, application Japan, October 6, 1969, No. 79152/69 --

Signed and sealed this 6th day of August 1974.

(SEAL)
Attest:

McCOY M. GIBSON, JR.
Attesting Officer

C. MARSHALL DANN
Commissioner of Patents